Nov. 11, 1958  J. W. LUCAS  2,859,660
PROJECTION DEVICE ADAPTED TO RECEIVE PROJECTED IMAGES
Filed Nov. 1, 1955  2 Sheets-Sheet 1
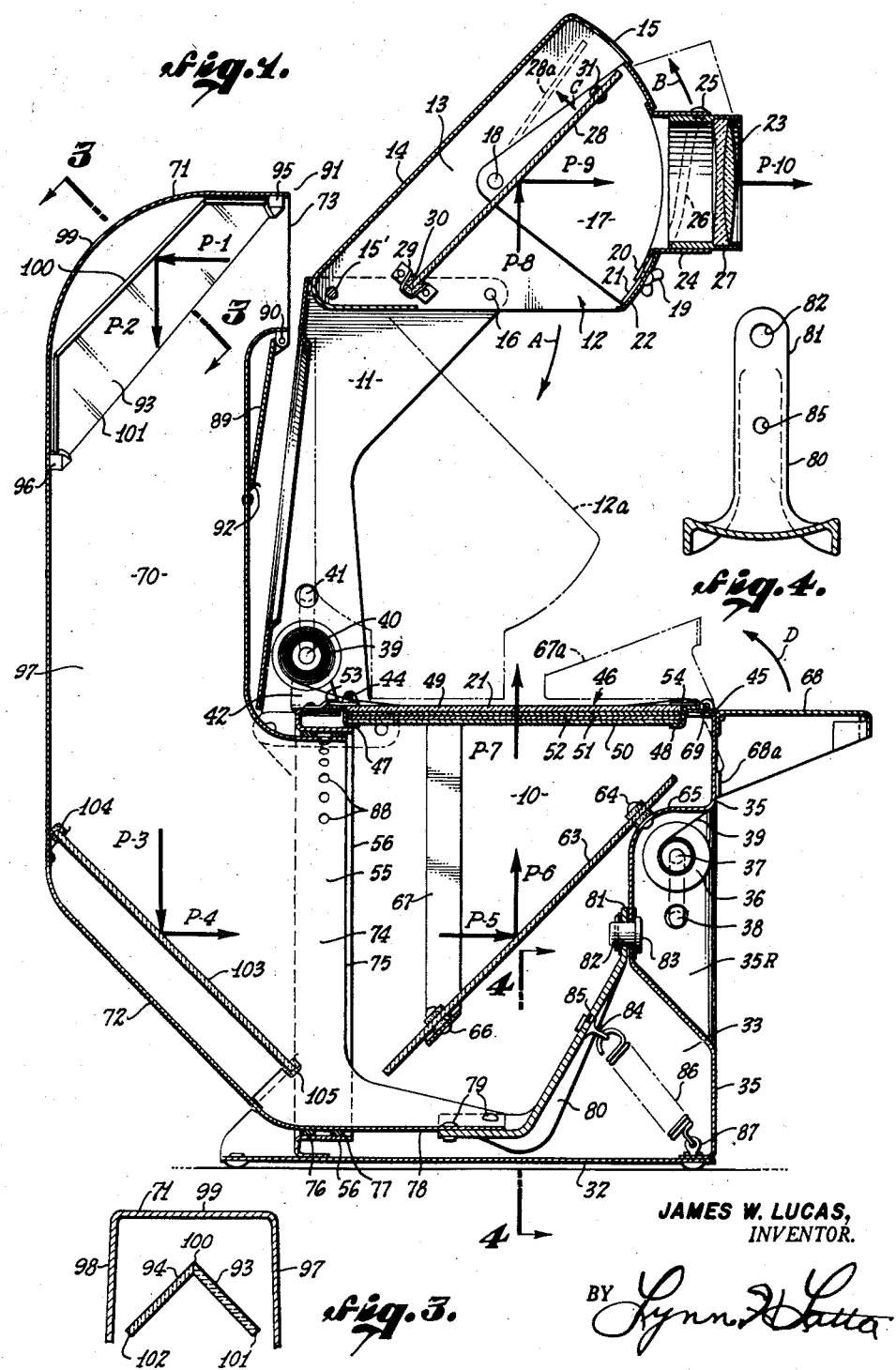
JAMES W. LUCAS,
INVENTOR.
BY Lynn Latta
ATTORNEY.

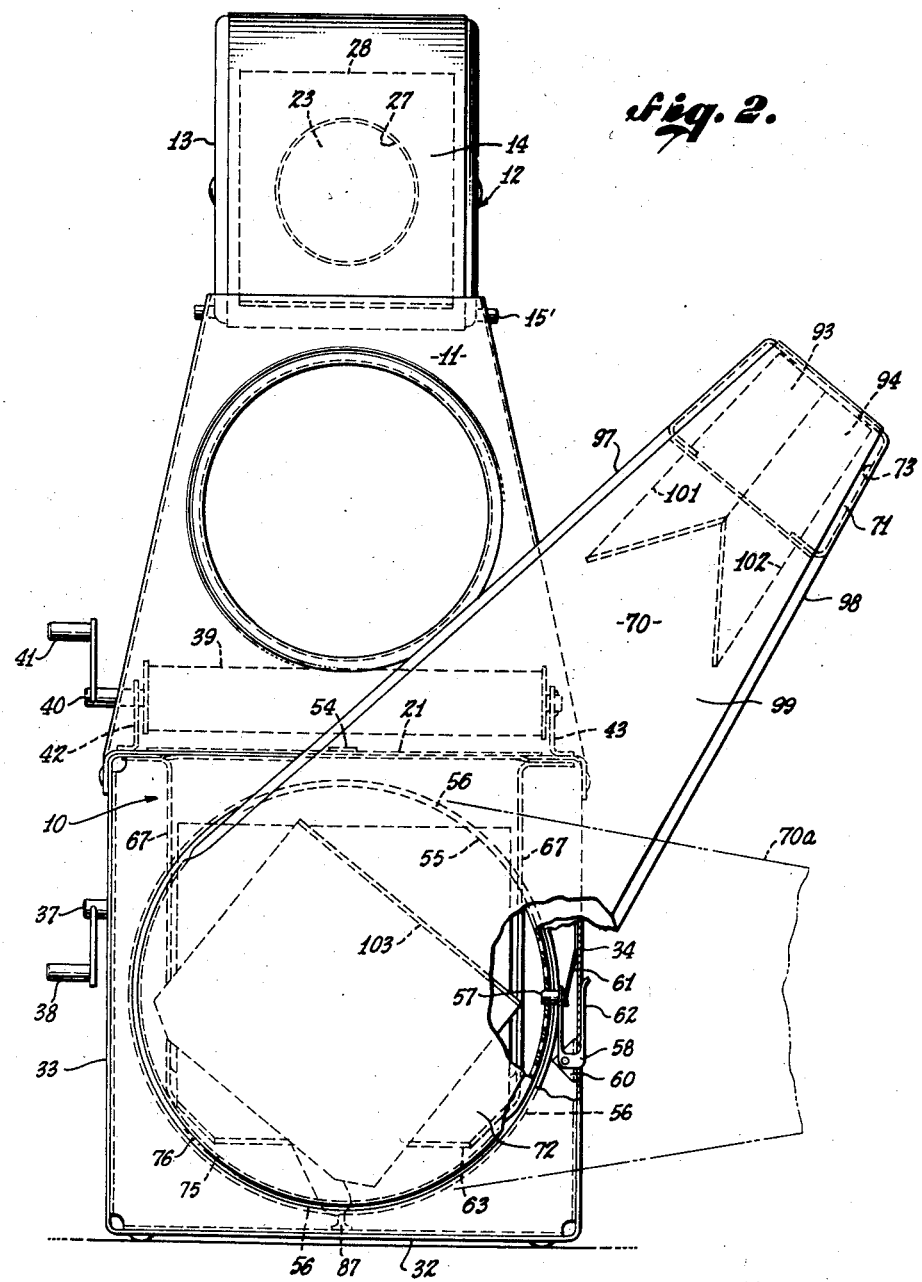

United States Patent Office 2,859,660
Patented Nov. 11, 1958

2,859,660

PROJECTION DEVICE ADAPTED TO RECEIVE PROJECTED IMAGES

James W. Lucas, Pacific Palisades, Calif.

Application November 1, 1955, Serial No. 544,301

13 Claims. (Cl. 88—24)

This invention relates to the projection of motion picture films of all sizes and types and to the projection of still pictures originating from transparencies, slides or opaque subject material, and more particularly, it relates to a device for super-imposing over any kind of pictures being projected a second series of images prepared in advance or drawn or written as the pictures are being projected.

In further classifying my invention it should be understood that it is not a complete projector, in the functional sense, since it has neither a light source and condensing system therefor nor intermittent movement and shutter for motion picture film or mechanical means such as holders and magazines for transparent slides or opaque material such as are included in conventional projectors of various kinds.

Instead, the device of my invention might be best described as a re-projecting device which when placed in the picture beam of any conventional projector receives the projected image therefrom on an established focal plane at which are positioned means for adding other pictorial material, and then with its own objective optical system projects onto a screen the composite image formed at the focal plane. The material added to the original picture may either be stationary and motionless or may include movements such as handwriting, pointing and drawing, together with vertical movement on the screen of pictorial material prepared in advance or drawings and notations made while the picture is being projected.

Due to the increased availability since the advent of 16 mm. motion picture film and single and double frame film strips and slides of highly efficient low-cost projectors of various kinds, the use of visual aid material with students of all ages has not only increased immeasurably but has now become an important element in many courses of study. This wide-spread use of visual material has prompted the development of many new types of projectors to meet the particular needs in the educational field, and a better understanding of the objects of this invention will be obtained from the following brief details concerning these needs.

Educators have found, for example, that it is advantageous to have the projector operable from the front of the classroom near the screen so that the instructor will face the class at all times. It has also been found important to be able to interrupt the picture series for the purpose of discussion and explanation and, in the case of still pictures to be able to hold the picture on the screen for several seconds or even minutes. Furthermore, it has been found helpful to be able to point out certain objects in the picture on the screen and add written material or other indicia.

To meet these new functional requirements several new projectors have been developed, each new device being of specialized and limited use and requiring a certain size and physical form of the pictorial material to be projected.

Of the projectors presently available to the users of visual aids there are a few which permit the addition of hand written notes, drawings and diagrams to images projected from transparent slides, but the slides must be especially made for the purpose in an uncommon large size to fit the particular projector. For some of these projectors additional attachments for conventional projection of transparencies of standard sizes are available, but no practical provision is made by which impromptu pictorial matter may be added to generally available transparencies of smalll sizes. In fact, none of the projectors now on the market, at least so far as has been ascertained by a thorough survey of the field, has any practical means for adding drawings and notations to still pictures projected from small transparencies and from opaque originals; none can be used in this manner with motion pictures, and, most certainly, none permits the inclusion of additional impromptu pictorial material with any and all types of projected pictures.

As a result of the foregoing, the user of visual aids is currently in a state of constant confusion and compromise trying to select pictorial subject matter that is amenable to new classroom techniques when used with this present projection equipment, or hunting for new projectors to accommodate available pictorial subject matter, or remaking his old subject matter in a different size to fit a particular and highly specialized new projector.

The present invention has been made with the foregoing considerations in mind and has the following more important objects:

One very important object of this invention is the provision of a device adapted to add to any type of picture being projected by any conventional type of projector extra pictorial matter of various kinds.

Another important object of this invention is the provision of a device adapted to super-impose supplementary pictorial material upon a picture being projected and furthermore to include certain elements of movement in the super-imposed portion of the composite picture.

A further important object of this invention is the provision of a device of the character described which makes possible the introduction into any projected picture of pictorial matter written or drawn as the picture is being projected.

Another object of my invention is the provision of a device with which the light beam of any projector may be bent backwardly permitting the screen to be placed behind the projector instead of in front of it.

A still further important object of this invention is the provision of a device adapted to produce a much larger screen image than that normally provided by the lens of the projector at the particular length of throw.

And an additional important object of my invention is the provision of a projection adapter which when used with any projector will provide a screen image of predetermined size irrespective of the focal length of the lens of the projector with which it is used.

In brief, the device of my invention includes a periscope-like hollow arm member having elbow sections at each end opening in the same direction and optical elements disposed within the elbow sections adapted to bend the light beam thrown therein by any projector laterally substantially 90° and thence along any radial path, and then backwardly in a direction opposite to that of the beam leaving the projection lens. The egress aperture of the hollow arm opens into a box-like chamber in which a mirror is positioned so as to direct a light beam from the arm aperture onto the planar surface of a condensing element. A roll of cellophane is disposed on spools so that it may be wound across the planar surface and notations, drawings and the like made thereon while the pictures are being projected. A mirror disposed outwardly of the chamber directs the coplanar composite image formed in this manner through an objective lens onto a screen.

Additional objects and distinguishing features of this invention will become apparent upon reading the more detailed specification which follows and by reference to the accompanying drawings of which:

Figure 1 is a longitudinal sectional view showing the position of structural and optical elements in the adapter and the manner in which the light beam is bent at various points;

Figure 2 is a rear view of the device showing the means for rotating the arm member and for locking it in any position relative to the vertical body of the adapter;

Figure 3 is a schematic diagrammatic view taken in the direction of the arrows 3 in Figure 1, showing the angle at which the pair of reflecting mirrors is positioned in the ingress aperture of the arm, and Figure 4 is a partially sectional front view of the bracket member used to secure the arm member in rotative attachment with the body structure.

The projection adapter of my invention includes four principal sections: a box-like basal body portion, a lens mount assembly and the supporting structure to position it above the basal section, and a periscope-like tubular radially rotatable member opening into the rear of the basal section.

Reference is again made to Figure 1, in which the numeral 10 designates the box-like basal body section of the device having a supporting frame 11 extending upwardly therefrom and a lens mount assembly 12 including an outer casing having opposite triangular sides, as at 13, a flat top 14 and an arcuate frontal portion 15. The casing is pivotally attached to the frame 11 by pivot pins as at 15', and is held in the upper position shown in Figure 1 by the engagement of detent members 16 in the forwardly disposed upper corners of the frame 11.

A lens mounting member 17, conformed similarly to the casing 13 and interfitting therewith, is movably attached to the sides of the casing 13 by pivot means 18 whereby it may be rotated upwardly as indicated by the arrow B, thereby raising the picture on the screen, and is secured at the desired angle by tightening the wing nut 19 upon the bolt 20 entered through a bore and aligning slot in the juxtaposed surfaces, 21 and 22. A projection lens 23 of suitable focal length is enterable in a forwardly disposed barrel member 24, and is positioned longitudinally therein by the engagement of a pin 25 in the helical groove 26 in the outer periphery of the tubular member 27 in which the lens 23 is mounted.

A front-surface mirror 28 is movably supported within the sides of the casing 13 and the lens mounting member 17 by a transverse member 29 having a V-shaped recess 30 therein rigidly attached between the two sides, such as 13, of the casing, and by two clamp members such as 31, fixedly attached to both sides of the mirror 28 and rotatably attached to both sides of the lens mounting member 17. Thus when the lens mounting member 17 is rotated upwardly on the axis of the pivot points 18, the mirror clamps 31 rotate in the sides of the lens mounting member 17 and the mirror 28 moves from one side to the other of the V-shaped recess 30 in the transverse member 29, and as the lens barrel 24 rotates as shown by arrow B, the mirror 28 rotates relatively as shown by arrow C to the position designated as 28–a. This movement of the mirror 28 relative to the movement of the lens 23 is highly important since it serves to keep the projected light beam indicated by arrows P–8 and P–9 squarely in the middle of the objective lens 23 regardless of the upward angle at which the latter is disposed.

For greater compactness during storage and when enclosed in a carrying case, the entire lens mount assembly 12, upon disengagement of the detent members 16, may be rotated downwardly about the axis of the pivot points 15 in the direction indicated by the arrow A to the position shown in phantom and designated as 12–a.

Referring again to the box-like basal body section 10, seen in longitudinal through section in Figure 1 and from the rear in Figure 2, the top 21, bottom 32, and opposite sides 33 and 34 are generally flat in conformation. The front surface 35 is irregularly formed, having a recess 35–R disposed inwardly between the sides 33 and 34 in which a take-up spool 36 for a roll of cellophane 39 is disposed on an axial spindle 37 journalled in bores in the sides and having a fixedly attached crank and handle 38 for rotation thereof.

The unused roll of cellophane 39 is disposed on a second spool having an axial member 40 disposed in bores in opposite upright brackets 42 and 43 mounted on the top 21 of the body section 10, and is fitted with a crank and handle 41. From the spool 40, the cellophane band 39 is carried under a transverse guide roller 44, across the top 21 of the body section 10, then over the rounded frontal corner 45 and thence downwardly around the front 35 of the body portion 10, into the recessed portion 35–R and onto the second spool 36.

An opening designated generally by the numeral 46, is disposed in the top 21 of the body section 10 between the Z-angle members 47 and 48 which provide support for a plurality of superposed planar members including an upper cover glass 49, a lower cover glass 50, and, in this particular embodiment, two acrylic sheet condensing elements 51 and 52 juxtaposed between the upper and lower cover glasses and secured by means of clamp members 53 and 54 on the upper surface 21 of the body section 10.

A large circular opening 55 is provided in the back of the body section 10, the opening 55 being conformed with an in-bent circumferential rim 56, which will be best understood by reference to both Figures 1 and 2.

Adjacent the side 34 of the body section 10, a plunger 57 attached to one end of a U-shaped lever member 58, is extended inwardly of the opening 55 through a bore in the rim 56, and is held therein by pressure of a leaf spring 61, as best seen in Figure 2. The U-shaped lever member 58 is pivotally attached to a bracket 60 disposed inwardly of the body section 10 from the inner surface of the sidewall 34, and the end 62 of the lever 58 opposite the plunger end 57 is disposed through a slot in the sidewall 34 to provide external handle means for movement of the plunger 57 through the bore in the rim 56.

A large front-surface mirror 63 is positioned diagonally within the body section 10, and is held in position by padded bolt members such as 64 in Figure 1 extended through the upper portion of the inbent wall 65 of the frontal recess 35–R, and similar bolt members 66 attached to supporting straps as at 67 depending from the under surface of the top 21 of the body section 10.

The mirror 63 is positioned in a diagonal plane disposed at a 45 degree angle relative to the horizontal plane of the top 21 and to the vertical plane of the rear opening 55, and furthermore, is positioned so that a horizontal centerline of reference across the mirror would be parallel to the top and back planes of the body section 10.

A shelf-like arm rest 68 having supporting legs 68–a which bear against the front 35 of the body 10, is rotatably attached to the rounded front corner 45 by pivot members such as 69 at each side of the body so that it can be swung in the direction of arrow D to the position above the body top 21 as indicated at 67–A.

A generally tubular longitudinally extended arm member 70 having right angular elbow sections 71 and 72 at the ends thereof, is rotatably attached to the rear of the body section 10. The opening 73 of the elbow section 71 is generally rectangular in form whereas the opening 74 of the elbow section 72 is circular and conformed to provide a short sleeve section, inwardly from its terminal edge 75, which is reinforced externally by two tight fitting bearing rings 76 and 77 which, in turn, are dimensioned in diameter to fit snugly but rotatably within the rim member 56 defining the opening 55 in the rear of the body section 10.

The sectional view in Figure 1 of the arm member 70 is taken with the arm in an upright vertical position relative to the base 32 of the body section 10, but the manner in which it is increased in width from the small elbow section 71 to that of the section 72, and the manner in which it rotates radially, is best seen in the rear view of Figure 2 in which it is shown slightly rotated clockwise at 70 and disposed substantially horizontally at 70–A.

As can be seen in Figure 1, the outwardly disposed portion of the elbow section 72 is extended beyond the edge 75 to provide an arcuate basal section 78 tapering downwardly and inwardly adjacent the bottom 32 toward the center thereof where it is fixedly attached by bolts 79 to an angle bracket 80, also seen in Figure 4. The opposite end 81 of the angle bracket 80 is disposed upwardly within the body 10 at substantially right angles to the basal portion 78 of the arm 70, and is rotatably secured by means of a pin 83 entered in the bore 82 adjacent the end 81. The pin 83 is disposed in alignment with the axial centerline of the rim 56 and the interfitting sleeve rings 76 and 77, thereby assuring that the arm 70 will remain perpendicular to the centerline of the body section 10 irrespective of the radial angle to which the arm 70 may be rotated.

An eyebolt 84 entered through a bore 85 intermediate of the ends of the angle bracket 80 provides attachment means for a coil spring 86 which is secured by a second eyebolt 87 to the bottom 32 of the body section 10 adjacent the frontal edge thereof. Tension upon the spring 86 serves to prevent the arm 70 from swinging downwardly under the weight of its extended end 71 while being rotated to any angle such as shown at 70 and 70–A in Figure 2.

A plurality of perforations 88 is disposed around the opening 74 of the sleeve portion of the arm 70 between the rings 76 and 77, and are positioned to receive the plunger 57 disposed inwardly of the side 34 of the body section to hold the arm at any predetermined radial angle. The coil spring 86 serves only as a general counterbalance, and the plunger 57 provides means for locking the arm in a fixed radially disposed position on either side of the adapter so that the opening 73 of the arm 70 will receive the light beam of the projector.

Adjacent the elbow section 71, a dust cap 89 is pivotally attached at 90 to the arm 70 along the inner side of the opening 73 and is held in the closed position over the opening 73 by a spring clip 91 and in the open position, as shown in Figure 1, when the projector is in use by the spring clip 92.

Two front-surface mirrors, 93 in Figure 1, and 93 and 94 in Figures 2 and 3, positioned edge to edge at right angles to each other, are disposed inwardly of the elbow section 71 and held in position by clamp members such as 95 and 96. The position of the mirror surfaces relative to the sectional profile of the structure is best understood by reference to Figure 3 which is taken in the direction of the arrows 3 in Figure 1. The planes of the mirrors 93 and 94 are perpendicular to each other and both are disposed at 45 degree angles relative to the sides 97 and 98 and the back 99. Also, as is best seen in Figure 1, the mirrors 93 and 94 are cut in trapezoidal form and are substantially longer along their spaced sides 101 and 102, which are secured by brackets as at 95 and 96, than along the edge 100 along which they adjoin.

A third front-surface mirror 103 is positioned inwardly of the circular opening 74 in the elbow section 72 at an angle of 45 degrees relative to the plane of the edge 75 of the opening 74 and to the longitudinal centerline of the arm 70, and, as a consequence, at a 90 degree angle relative to the junction line 100 of the mirrors 93 and 94. The mirror 103 is held in position by clamp members such as 104 and 105 which, in turn, are fixedly attached to the inner surface of the elbow section 72.

As will be understood by persons familiar with the art, the right angularly positioned reflecting surfaces 93 and 94 function in much the same manner as a conventional roof prism and are effective when used with the mirror 103 as shown in Figure 1 to maintain the vertical disposition of the image projected into the opening 73 and keep the frame lines of the picture parallel to the margins of the opening 46 regardless of the diagonal angle at which the two mirrors intercept the path of the projected beam.

However, a pair of reflecting surfaces of this type, being disposed at right angles to each other, has the property of reversing the image reflected therefrom from right to left, and to overcome this undesirable characteristic the picture slide or film is inserted in the projector in reverse lateral positioning, i. e.: upside down, as usual, but with the side of the slide normally placed toward the lens turned toward the lamp.

The optical path of the picture and the manner in which pictorial material is added to the original picture is clearly indicated in Figure 1. The light beam from the projector being used with the adapter is projected into the opening 73 of the arm 70 in the direction of arrow P–1 and is reflected downwardly by mirrors 93 and 94 in the direction of arrows P–2 and P–3 onto the mirror 103 from which it is reflected forwardly through the common opening designated as 74 and 55 in the direction of arrows P–4 and P–5 to the surface of mirror 63 from which it is thrown upwardly in the direction of arrows P–6 and P–7 where it is condensed and concentrated by the fresnel condensing elements 51 and 52. At this point any markings or lettering on the cellophane 39 disposed over the opening 46 would be opaque and prevent the transmission of light therethrough thereby causing the lines to appear black on the screen when reflected by the mirror 28 in the direction of the arrow P–9 through the projection lens 23 as indicated by the arrow P–10.

In the use of the projection adapter of my invention, the equipment would be made ready for use as follows: The adapter is positioned on a table with the lens pointing toward the screen on which the pictures are to be projected; the projector to be used in showing the pictures is placed on the table on either side of and parallel to the adapter, but with its lens pointing away from the screen; the arm lock release lever 62 is pulled outwardly of the side 34 of the base section 10, and the arm member of the adapter is rotated radially of the centerline of the adapter so that the small opening 73 of the arm 70 is in front of the projector lens; a test slide is placed in the projector in reverse lateral position, as described above, the projection lamp is lighted and the light beam is projected into the arm opening; using as a guide the faint residual image that will be visible at the plane of the cover glass 49 of the opening 46, the operator moves the projector and adjusts its lens until the projected image is centered on the opening 46 and sharply focused at the plane 49; the table is then moved laterally to center the picture vertically on the screen and the lens mount assembly 17 is raised or lowered to center the image horizontally on the screen, and the lens 23 is rotated in the barrel 24 to make the image on the screen as sharp and clear as possible; the cellophane 39 is adjusted over the opening 46 and handle 38 or 41 turned as required to bring a clean portion of cellophane over the opening or to position material that may have been printed or drawn in advance into proper position relative to the opening and the latent trace of the projected image concentrated thereon; and after a final check of the composite image on the screen formed by the image projected by the projector and the written or printed material added on the cellophane of the adapter, the equipment is ready for use.

As has been previously mentioned, the operator of the equipment can also deliver a lecture or a description of the pictures projected, or may write into any picture any marks or copy desired. He faces the audience watching before him on the plane of the cellophane 39 and the cover glass 49 the pictures that the audience sees on the screen behind him.

In order to comply with the statute this invention has been described in considerable detail and in terms of one particular embodiment, but it is to be understood that these details and the nature of the embodiment itself are subject to various changes and variations, and the invention therefore is not to be limited in scope except as may be indicated by the extent of the claims which follow:

I claim:

1. In combination, a re-projection device adapted to receive the projected image from the projection beam of a conventional projector upon an established focal plane; and means positioned at said plane for adding pictorial matter to the projected images on said plane, said re-projection device comprising: means for reversing the direction of said projected light beam comprising a generally tubular arm member being longitudinally extended and having elbow sections disposed at each end thereof, the apertures of said elbow sections being disposed in the same direction; a pair of reflecting surfaces adjoined at right angles to each other being fixedly positioned in one of said elbow sections at an angle of 45 degrees to the plane of the aperture thereof; a single reflecting surface fixedly positioned within said elbow section at the other end of said arm member at an angle of 90 degrees to said pair of reflecting surfaces and at an angle of 45 degrees relative to the plane of the elbow aperture adjacent thereto; and means for supporting said arm member forwardly of said projector and perpendicular to the centerline of said light beam, said light beam being projected into said arm member through an elbow aperture thereof upon said pair of right-angularly disposed reflecting surfaces.

2. In combination, a re-projection device adapted to receive the projected image from the projection beam of a conventional projector upon an established focal plane; and means positioned at said plane for adding pictorial matter to the projected images on said plane, said re-projection device comprising: means for reversing the direction of said projected light beam comprising a generally tubular arm member being longitudinally extended and having elbow sections disposed at each end thereof, the apertures of said elbow sections being disposed in the same direction; a pair of reflecting surfaces adjoined at right angles to each other being fixedly positioned in one of said elbow sections at an angle of 45 degrees to the plane of the aperture thereof; a single reflecting surface fixedly positioned within said elbow section at the other end of said arm member at an angle of 90 degrees to said pair of reflecting surfaces and at an angle of 45 degrees relative to the plane of the elbow aperture adjacent thereto; and means for supporting said arm member forwardly of said projector perpendicular to the centerline of said light beam and at any radial angle relative thereto, said light beam being projected into said arm member through an elbow aperture thereof upon said pair of right-angularly disposed reflecting surfaces.

3. The invention as described in claim 2, wherein the opening of said elbow section adjacent said pair of reflecting surfaces is substantially square and the opening of said elbow section adjacent said single reflecting surface is circular.

4. The invention as described in claim 3 in which said means for supporting said arm member forwardly of said projector comprises: a box-like base member having a substantially rectangular aperture in the top and a circular aperture in one side thereof; means providing a reflecting surface disposed interiorly of said base member at an angle of 45 degrees relative to said rectangular and circular apertures; means for forming a picture image within said rectangular aperture and lens means for projecting said picture onto a screen; said circular opening in said base member being adapted to receive the circular portion of said elbow section of said arm member therein, and pivot means disposed within said base member, effective to hold said circular portion of said elbow interiorly of said circular aperture and to hold said arm member perpendicular to the axial centerline of said aperture and at any radial angle relative to said centerline.

5. Re-projection apparatus adapted to receive the projected primary images from a conventional projector upon an established focal plane and to add secondary images to the primary images on a common screen at said plane; said re-projection apparatus being adapted to project visible images from said common screen at said plane and comprising: a box-like base member having a substantially rectangular aperture in the top and a circular aperture in one side thereof and a reflecting surface disposed therein at an angle of 45 degrees relative to said apertures; reflecting means for offsetting the light beam of said projector radially from its original directional centerline into said circular aperture of said base onto said reflecting surface therein to said rectangular aperture in the top thereof; means for forming said projected beam into an aerial image at a predetermined focal plane in said rectangular aperture; a generally transparent image-bearing medium adapted to receive secondary images thereon and means for supporting said image-bearing medium at said focal plane, and reflecting and lens means adapted to receive and project said aerial and secondary images in the form of a composite visible image on a screen.

6. The invention as described in claim 5 in which said reflecting means for offsetting the projected light beam radially from its original centerline comprises: a generally tubular arm member having elbow sections affixed to each end thereof, the apertures of said elbow sections being disposed in the same direction; one of said apertures being substantially rectangular in conformation and the other being circular and of substantially greater area; a reflecting surface disposed inwardly of said arm member adjacent each of said apertures and at angles of 45 degrees relative thereto and at right angles to each other; pivot means disposed interiorly of said base, effective to hold said circular elbow portion interiorly of said circular aperture of said base and said arm member generally perpendicular to the axial centerline of said aperture and at any radial angle relative thereto.

7. The invention as described in claim 6, further including means for maintaining the normally horizontal top and bottom picture alignment of said radially offset light beam, said means comprising: said reflecting surface disposed interiorly of said tubular arm member adjacent said rectangular aperture thereof being formed of two plane reflecting surfaces disposed at right angles to each other in the manner of a roof prism.

8. The invention in accordance with claim 7 in which said means for forming an aerial image at a predetermined focal plane comprises: a pair of channel-shaped supports disposed interiorly of said base along opposite sides of said rectangular aperture in the top thereof, said supports being adapted to receive a plurality of rectangular panels therein adjacent said aperture; a pair of panels of rigid transparent optically clear material and an acrylic fresnel having a plurality of concentric condensing rings therein, juxtaposed upon said supports, said fresnel being between said rigid panels, the upper surface of the top panel being supported within said aperture in coplanar alignment with the upper surface of said top of said base, and said lens of said projector being focused to provide a sharp picture image at said upper surface.

9. The invention in accordance with claim 8, further characterized by an image-bearing medium movably supported at said focal plane, comprising: a pair of flanged winding spools, one being rotatably secured adjacent said top of said base above said apertured side thereof, the other being journalled in a recess in the side of said base parallel to and spaced from said circularly apertured side; said spools being dimensioned in width to receive a band of flexible transparent material of a width adapted to cover said rectangular aperture in the top of said base; roller guide means for holding said band of transparent material in alignment with the sides of said upper panel disposed within said rectangular aperture, and crank means effective to wind said band from either of said spools to the other.

10. The invention in accordance with claim 9, further including a vertical support member extended upwardly from said base member; a hood assembly pivotally attached to said vertical arm; a projection lens rotatably mounted in the side of said hood and spaced from the point of said pivotal attachment, and a diagonally disposed reflecting surface interiorly of said hood, effective to direct picture images formed at said focal plane into said projection lens and thence upon a viewing screen, said hood and said lens affixed therein being rotatable downwardly relative to said pivot point.

11. A re-projection device adapted to receive the projected image from the projection beam of a conventional projector upon an established focal plane; and means positioned at said plane for adding pictorial matter to the projected images on said plane, said re-projection device comprising a main body portion defining a substantially square case, said case having a generally rectangular aperture in the top and a circular aperture in one side thereof, and a reflecting mirror disposed therein at an angle of 45 degrees relative to each of said apertures; support members secured to the undersurface of said top of said body adjacent opposite sides of said rectangular aperture; an acrylic Fresnel lens having therein a plurality of integrally conformed concentric rings of progressively increased diameter and pitch, and a pair of rigid transparent panels, said Fresnel lens being interposed therebetween, secured by said support members adjacent and interiorly of said rectangular aperture and in coplanar alignment with the upper surface of said top of said main body; and, a generally conventional projector having a light source and lens and picture-forming elements disposed therebetween in its light beam, said projector being positioned whereby its light beam is directed generally horizontally through said circular aperture onto said angular mirror and thence upwardly through said rectangular aperture, said projector lens being adjusted in a manner whereby the images projected therefrom are sharply focused along the plane of said fresnel.

12. The invention as set forth in claim 11 in which said concentric rings of said fresnel are pitched relative to the diverging rays of said light beam of said projector whereby a faint residual image is visible along the upper surface of said fresnel.

13. The combination comprising: means for forming an aerial image as set forth in claim 12, and means for adding pictorial material thereto including a pair of flanged winding spools journalled on opposite sides of said rectangular aperture, said spools being adapted to carry a band of substantially transparent flexible material; crank means effective to wind said band from either of said spools to the other, and projection lens and reflecting means adapted to receive said aerial image together with secondary images pre-formed on said band or drawn thereon during projection of said images, and to project the composite image thereof onto a viewing screen.

References Cited in the file of this patent
UNITED STATES PATENTS

| | | |
|---|---|---|
| 1,346,359 | Wenderhold | July 13, 1920 |
| 1,352,841 | Silver | Sept. 14, 1920 |
| 1,480,112 | Poppenhusen | Jan. 8, 1924 |
| 1,545,674 | MacKay | July 14, 1925 |
| 1,945,926 | Tolhurst | Feb. 6, 1934 |
| 2,061,378 | Henze et al. | Nov. 17, 1936 |
| 2,250,174 | Bancroft | July 22, 1941 |
| 2,288,143 | Sheppard | June 30, 1942 |
| 2,334,962 | Seitz | Nov. 23, 1943 |
| 2,488,955 | Wood | Nov. 22, 1949 |
| 2,489,789 | Korkosz | Nov. 29, 1949 |
| 2,699,704 | Fitzgerald | Jan. 18, 1955 |